Oct. 16, 1923.

E. P. VINCENT

KITCHEN UTENSIL

Filed July 8, 1922

1,470,783

INVENTOR
BY Ernest P. Vincent

ATTORNEY

Patented Oct. 16, 1923.

1,470,783

UNITED STATES PATENT OFFICE.

ERNEST P. VINCENT, OF NEW YORK, N. Y.

KITCHEN UTENSIL.

Application filed July 8, 1922. Serial No. 573,764.

*To all whom it may concern:*

Be it known that I, ERNEST PETER VINCENT, citizen of the United States, and resident of New York city, in the county of New York and State of New York, have invented certain new and useful Improvements in Kitchen Utensils, of which the following is a specification.

My invention relates to kitchen utensils, and more particularly has reference to a cutting or slicing device adapted for slicing cucumbers, potatoes, and other vegetables, fruit or food products providing suitable means for holding the same in position while slicing with an ordinary knife; as shown in the accompanying drawing.

Figure 1:
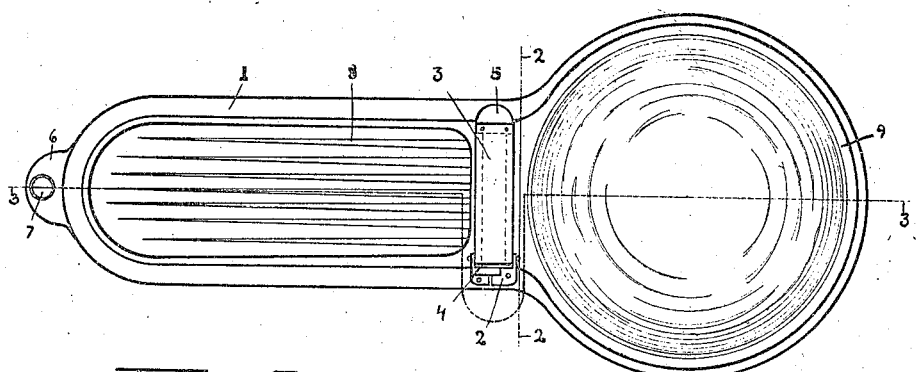

Fig. 1. is a plan view of the utensils embodying an application of my invention.

Figure 2:
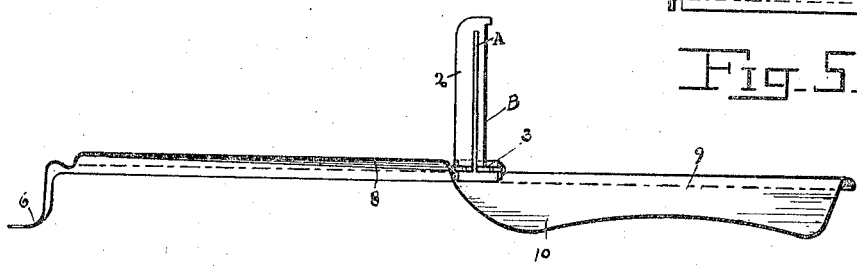

Fig. 2. is a cross section looking upwardly at Fig. 1; as indicated by the line 2—2 of Fig. 1.

Figure 3:
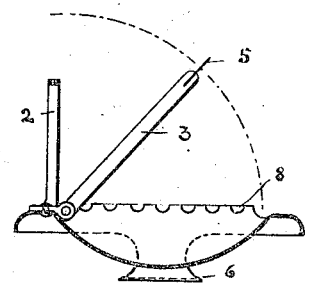

Fig. 3. is a cross section looking from right to left as indicated by the line 3—3 of Fig. 1.

Figure 4:

Fig. 4. is a modification of standard 2 and slicing block 3.

Figure 5:
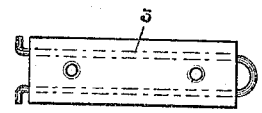

Fig. 5. is another modification of slicing block 3.

Referring to plan view Fig. 1 it will be plainly seen that by inserting an ordinary potato knife in slot A a fast and safe movement can be had while guiding the vegetables on the board 1 by the left hand, the knife may also be worked against the right side of standard 2 as indicated at B. 3 indicates a hinged or pivoted wood or fibre block adapted to be seated in the groove 4 when in use and provided with a lip 5 which rests upon the opposite side of the device so that when the knife is used it strikes the block instead of the metal part of the utensil.

The device is preferably made of aluminum or any other kind of material, and is provided with a combination foot and hanger 6 which is provided with a hole 7. The slicing board may also be provided with grooves such as 8 which are tapered and depressed in the direction of the bowl 9, thus allowing the juice to be collected therein, the bowl having a circular depression 10, which with the foot 6 serves as base or support for the utensil when in use.

Of course it will be understood that various modifications may be made in the construction and arrangement of parts without departing from the spirit of the invention as claimed.

I claim:

1. A kitchen utensil of the class described, a supporting board, provided with a raised portion, and in combination therewith a movable slicing block transversely mounted at one end adjacent said raised portion.

2. A kitchen utensil of the class described, a grooved metal supporting board, and in combination therewith a slicing block, and a knife-guide adjacent to said slicing block.

3. A kitchen utensil of the class described, a grooved metal supporting board, and in combination therewith a slicing block, a knife-guide adjacent to said block, and a receptacle below said slicing block.

4. A kitchen utensil of the class described, a raised metal supporting board, and in combination therewith a movable slicing block, a knife-guide adjacent to said block, and a receptacle below said slicing block.

ERNEST P. VINCENT.

Witnesses:
WILLIAM BOTHE,
W. E. MULDOON.